(12) United States Patent
Achkir et al.

(10) Patent No.: US 11,068,907 B2
(45) Date of Patent: Jul. 20, 2021

(54) PRODUCT LIFETIME USING DISTRIBUTED LEDGER TECHNOLOGY

(71) Applicant: Cisco Technology, Inc., San Jose, CA (US)

(72) Inventors: D. Brice Achkir, Livermore, CA (US); Pavan Mettu, Mountain View, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 158 days.

(21) Appl. No.: 16/544,214

(22) Filed: Aug. 19, 2019

(65) Prior Publication Data

US 2021/0056606 A1 Feb. 25, 2021

(51) Int. Cl.
| | |
|---|---|
| *G06Q 30/00* | (2012.01) |
| *G06Q 30/06* | (2012.01) |
| *G06F 16/182* | (2019.01) |
| *H04W 4/35* | (2018.01) |
| *G06Q 99/00* | (2006.01) |

(52) U.S. Cl.
CPC ....... *G06Q 30/018* (2013.01); *G06F 16/1824* (2019.01); *G06Q 30/0623* (2013.01); *G06Q 30/0625* (2013.01); *G06Q 30/0627* (2013.01); *H04W 4/35* (2018.02); *G06F 16/182* (2019.01); *G06Q 99/00* (2013.01)

(58) Field of Classification Search
None
See application file for complete search history.

(56) References Cited

U.S. PATENT DOCUMENTS

| | | | | | |
|---|---|---|---|---|---|
| 7,495,558 | B2* | 2/2009 | Pope | .................. | G06K 19/0717 340/572.1 |
| 8,074,720 | B2* | 12/2011 | Radi | ...................... | E21B 44/00 166/350 |
| 9,849,364 | B2 | 12/2017 | Tran et al. | | |
| 9,929,771 | B2* | 3/2018 | Rose | ........................ | H04B 1/40 |
| 9,929,772 | B2* | 3/2018 | Rose | ................... | H04B 1/1036 |
| 10,158,499 | B2* | 12/2018 | Sakata | ................ | H04L 12/2823 |
| 10,664,797 | B2* | 5/2020 | Chappell | .............. | G06Q 20/386 |
| 2005/0248455 | A1* | 11/2005 | Pope | ....................... | G01K 1/024 340/539.27 |
| 2007/0106897 | A1* | 5/2007 | Kulakowski | ............ | G06F 21/35 713/171 |
| 2008/0128138 | A1* | 6/2008 | Radi | ..................... | E21B 47/001 166/350 |

(Continued)

OTHER PUBLICATIONS

Islam et al., "On IC Traceability Via Blockchain," researchgate.net, IEEE, Apr. 2018, pp. 1-5.

*Primary Examiner* — Nicholas D Rosen

(74) *Attorney, Agent, or Firm* — Polsinelli PC

(57) ABSTRACT

Systems, methods, and devices are disclosed for authenticating and predicting the remaining lifetime of a resold product. Telemetry data is received from a transceiver within the product, which is then stored within a distributed ledger. The lifetime of the product is determined by analyzing the telemetry data in the distributed ledger according to one or more models. In response to receiving a query about the product, the user is granted read access to the distributed ledger, including read access to the determined lifetime of the product and the authentication of the product (in real or near real time).

20 Claims, 4 Drawing Sheets

(56) References Cited

U.S. PATENT DOCUMENTS

| | | | |
|---|---|---|---|
| 2016/0164697 A1* | 6/2016 | Sakata | G06Q 10/20 |
| | | | 700/275 |
| 2017/0046709 A1 | 2/2017 | Lee et al. | |
| 2017/0230074 A1* | 8/2017 | Rose | H04B 1/1036 |
| 2019/0026685 A1* | 1/2019 | Chappell | G06Q 30/06 |
| 2019/0065733 A1 | 2/2019 | Forehand | |
| 2019/0158270 A1 | 5/2019 | Berti | |
| 2020/0127910 A1* | 4/2020 | Hamzeh | H04L 63/1425 |
| 2021/0042803 A1* | 2/2021 | Achkir | G06Q 30/0641 |

* cited by examiner

PRODUCT LIFETIME USING DISTRIBUTED LEDGER TECHNOLOGY

TECHNICAL FIELD

The present disclosure relates generally to determining the remaining lifetime of a product, and more specifically to the verification and quality control of resold products.

BACKGROUND

Systems and/or products degrade in performance over time, eventually needing maintenance or replacement. Or in some cases, the systems or products may reach the end of a license agreement, and will be returned to the manufacturer or distributor at the end of the license agreement even if the systems or products do not need maintenance. Many companies will honor agreements whereby these systems and products can be repaired or replaced for a given period of time (or in some cases indefinitely—e.g., lifetime guarantees). However, it is difficult to keep track of every end user, especially since products may be resold or sold as counterfeit. Some companies, moreover, sell most of its products not to the end user, but through distribution channels (e.g., in some companies, more than 80% of products are sold this way). The distribution channels can be spread globally throughout numerous vendors.

When end users return their products (due to replacement, in exchange for a new product, or the end of a license agreement), these products are oftentimes capable of being resold. Most end users, for example, discard their products because they no longer fill their niche needs—not because the product no longer works. The resale process, called reverse logistics, can resell used or refurbished products through distribution channels such as EBay or other similar websites. In addition to supporting green technology initiatives (e.g., recycling and achieving renewable energy goals), reverse logistics can support extra revenue streams from these refurbished/gently used products as they are sold to other companies, users, etc.

There are multiple places, however, where knockoff products are being passed on as original products. These knockoffs are returned to the original companies to be serviced, resulting in revenue loss and lower quality products to the end user. Currently, there is no way for a company or end user to confirm whether the product is an authentic product. Moreover, even if the product is authentic, there is no way to accurately ascertain the condition of used products being resold.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DESCRIPTION OF EXAMPLE EMBODIMENTS

Figure 1:
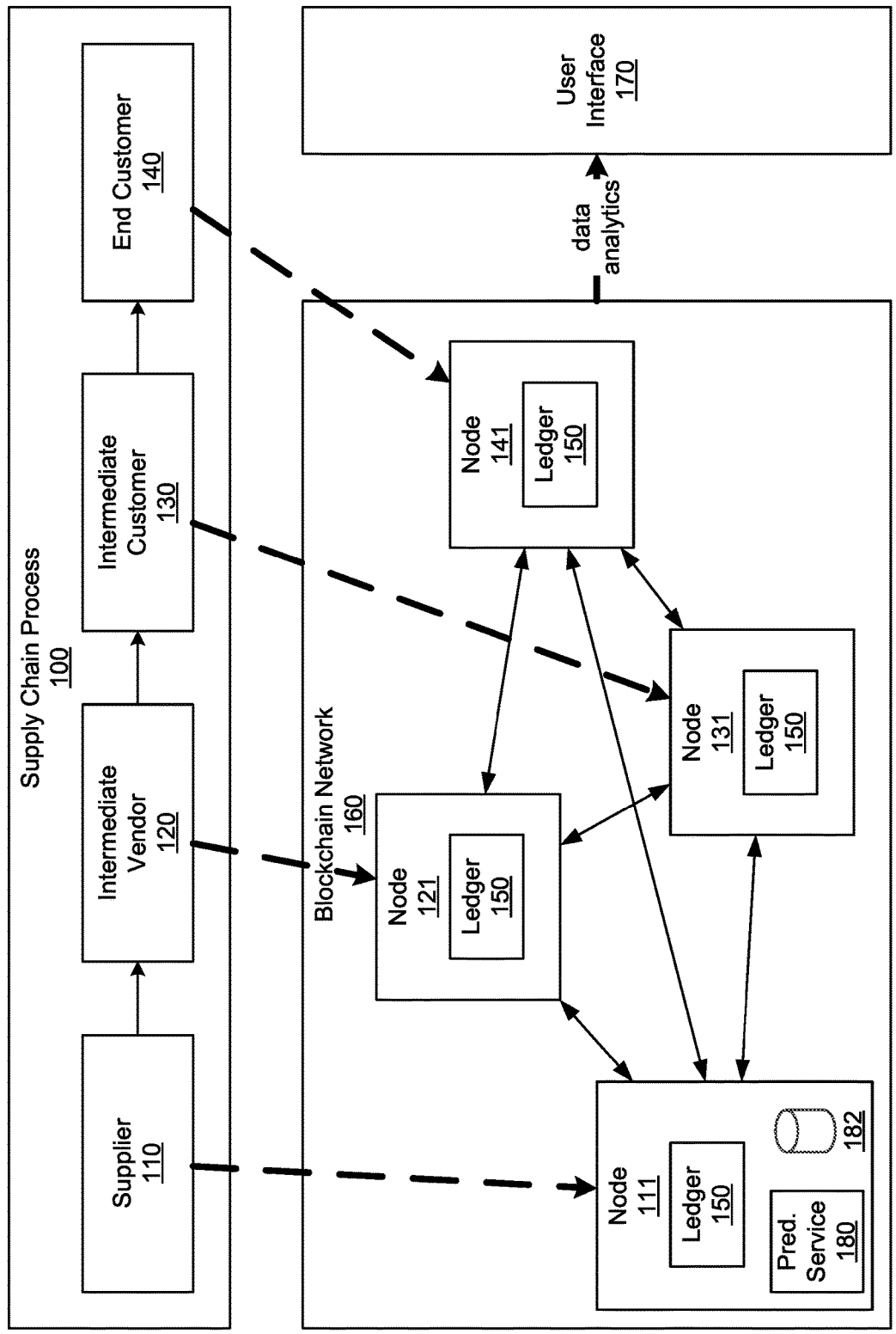
FIG. 1 shows an example schematic diagram of a supply chain network that includes various nodes that are configured to maintain a blockchain in accordance with some embodiments.

Various examples of the present technology are discussed in detail below. While specific implementations are discussed, it should be understood that this is done for illustration purposes only. A person skilled in the relevant art will recognize that other components and configurations may be used without parting from the spirit and scope of the present technology.

OVERVIEW

In some embodiments, methods, systems, and devices are disclosed for predicting product lifetime. Predicting product lifetime includes receiving, from a transceiver within the product, telemetry data of the product (e.g., data related to how the product has been or is being used, the specific configuration in place, etc.) at one or nodes of a distributed ledger system. The telemetry data is stored within the distributed ledger of the system. A lifetime of the product is then determined by analyzing the telemetry data in the distributed ledger according to one or more models. When a node receives a query about the product from a user, the user is granted read access to the determined lifetime of the product.

EXAMPLE EMBODIMENTS

The disclosed technology addresses the need in the art for utilizing blockchain technology to predict and display the lifetime of a product resold by certified vendors during resale. It utilizes an approach where data analytics based on a product's telemetry data can monitor and more accurately predict the remaining lifetime of the product, making the resale process trustworthy, decentralized, and visible to every end user on the blockchain. In some embodiments, the data analytics can be based on methodologies programmed within one or more smart contracts with intelligence, such as a smart contract service that applies to the blockchain system. Previously available blockchain systems do not employ abilities to track products beyond mere custody information and generally initiating payments between parties.

Systems, methods, and devices are disclosed for authenticating and predicting the remaining lifetime of a resold product. Telemetry data received from a transceiver within the product is stored within a distributed ledger on a real time or near real time basis. The transceiver can be any device, service, or mechanism by which data, such as telemetry data, can be both transmitted and received. One of ordinary skill in the art could envision the transceiver as a single device, service, or mechanism; or multiple devices, services, or mechanisms that include both transmitters and emitters. The transceiver is also not limited to optical devices or systems, but can apply to any optical-, electrical-, fiber optic-, metal based wiring-(e.g., copper), or wireless-based devices or systems to transmit and receive information. The lifetime of the product is then determined by analyzing the telemetry data in the distributed ledger according to one or more models based on data related to when the product was activated and put in service, load history, historical usage and performance, etc. In response to receiving a query about the product, the user is granted read access to the distributed ledger, including read access to the determined lifetime of the product and the authentication of the product (in real or near real time).

FIG. 1 shows an example schematic diagram of a supply chain network that includes various nodes that are configured to maintain a blockchain in accordance with some embodiments. Node 141, which is associated with an end customer 140 within the supply chain process 100, is one of many nodes within the distributed network, blockchain network 160. Blockchain network 160 can include any number of nodes corresponding to suppliers (e.g., vendor, plant, etc. involved with component construction, assembly, merging of components, etc.), vendors/partners (e.g., distributors, shippers, retailers, third party logistics providers, etc.), and customers that have been enabled as nodes on blockchain network 160, such as supplier 110 associated with node 111, intermediate vendor 120 associated with node 121, intermediate customer 130 associated with node 131, . . . to the end customer 140 associated with node 141. The supply chain process 100 represented from the beginning (e.g., supplier 110) to the current end customer 140 has nodes within blockchain network 160 that provide a record of transactions associated with the product on a real time or near real time basis. Each node on blockchain network 160—including all suppliers, vendors, and customers—include a copy of blockchain ledger 150 including all transactions associated with the product. Blockchain ledger 150 has been duplicated across all the nodes.

Blockchain network 160 can guarantee that a resold product is original and backed by specific enterprises, vendors, suppliers, and/or partners. In some embodiments, blockchain 160 can (1) certify the product, and (2) certify the supplier/vendor that supplied the product. As a result, since blockchain network 160 is distributed across many nodes, no one point of failure can provide a false certification. This means that data that is received about a product, such as telemetry data provided to a node within blockchain network 160 by the product itself, can be verified as coming from a genuine product (e.g., not counterfeited or modified).

Blockchain ledger 150 is any linked ledger system. In the embodiment shown, blockchain ledger 150 is a ledger system within a distributed blockchain, where a continuously growing list of records, called blocks, is linked to one or more previous blocks. Blocks can be continuously updated as blockchain ledger 150 is modified with subsequent transactions, data, updates, etc. from the nodes within blockchain network 160. For example, a block can record that a certain component, such as a transceiver on the product, has been manufactured by supplier 110 node 111, a later block can record that the product has been sold by intermediate vendor 120 of node 121 to intermediate customer 130, and another subsequent block can record that the product has been resold to end customer 140. This record can extend throughout the entire manufacturing, distribution, sale, and resale of the associated product, including receipt of materials (e.g., receiving, from an entity, product parts such as the wiring, transceiver parts, laser, etc. of a transceiver) to the end purchase (e.g., information that the product was purchased from a distributor or retailer, resold at a later date, and by whom).

In the embodiment shown, blockchain network 160 can be used and run by one organization or entity, which can manage security and control authorization for each node on the network in addition to managing business rules and policies. For example, the organization may grant a first node access to only a portion of some data on the blockchain, so that information from another node (who may be a competitor of the first node) is kept private from the first node. The organization may even keep some information private from all network nodes. Alternatively, in some embodiments blockchain network 160 may be, in part or in whole, a public distributed blockchain. However, one of skill in the art will understand that any architecture that supports a chain of custody of individual components can be used to the same effect.

Each node can include functionality to read and/or access blockchain ledger 150, record transactions, data, updates, etc. A customer may also access blockchain ledger 150 at user interface 170 on node 141, subject to certain rules, policies, and restrictions set by a management service applied across blockchain network 160. For example, a customer may be granted only read access to a portion of the data on blockchain ledger 150 so that sensitive internal business data for, say, supplier 110, is not made public. This is one difference between blockchain ledger 150 and a traditional public blockchain. Any authorized party can write to blockchain ledger 150 of the present technology, but authorized parties can only read data on blockchain ledger 150 to which they have specific access.

Blockchain network 160 can also include predictive service 180, which can analyze telemetry data from the product that's been stored within blockchain ledger 150. The telemetry data can be analyzed according to one or more models 182 to determine the product's remaining lifetime, such as models that determine the remaining lifetime based on the product's power consumption, usage over a period of time (e.g., used only 60% of the year), the product's load, etc. This telemetry can be collected once the product turned on as well as during its chain of custody. As soon as the product is turned on, for example, telemetry can begin to append information to the blockchain ledger 150 as part of the product history (e.g., the blockchain can monitor product performance and history on a real time or near real time basis). The data analytics associated with the prediction can be passed to the user interface 170 for viewing in response to a query about the product. The amount of information displayed about the product history can be adjusted based on the type of information and the person viewing it (e.g., the end user can view more information than the vendor).

Figure 2:
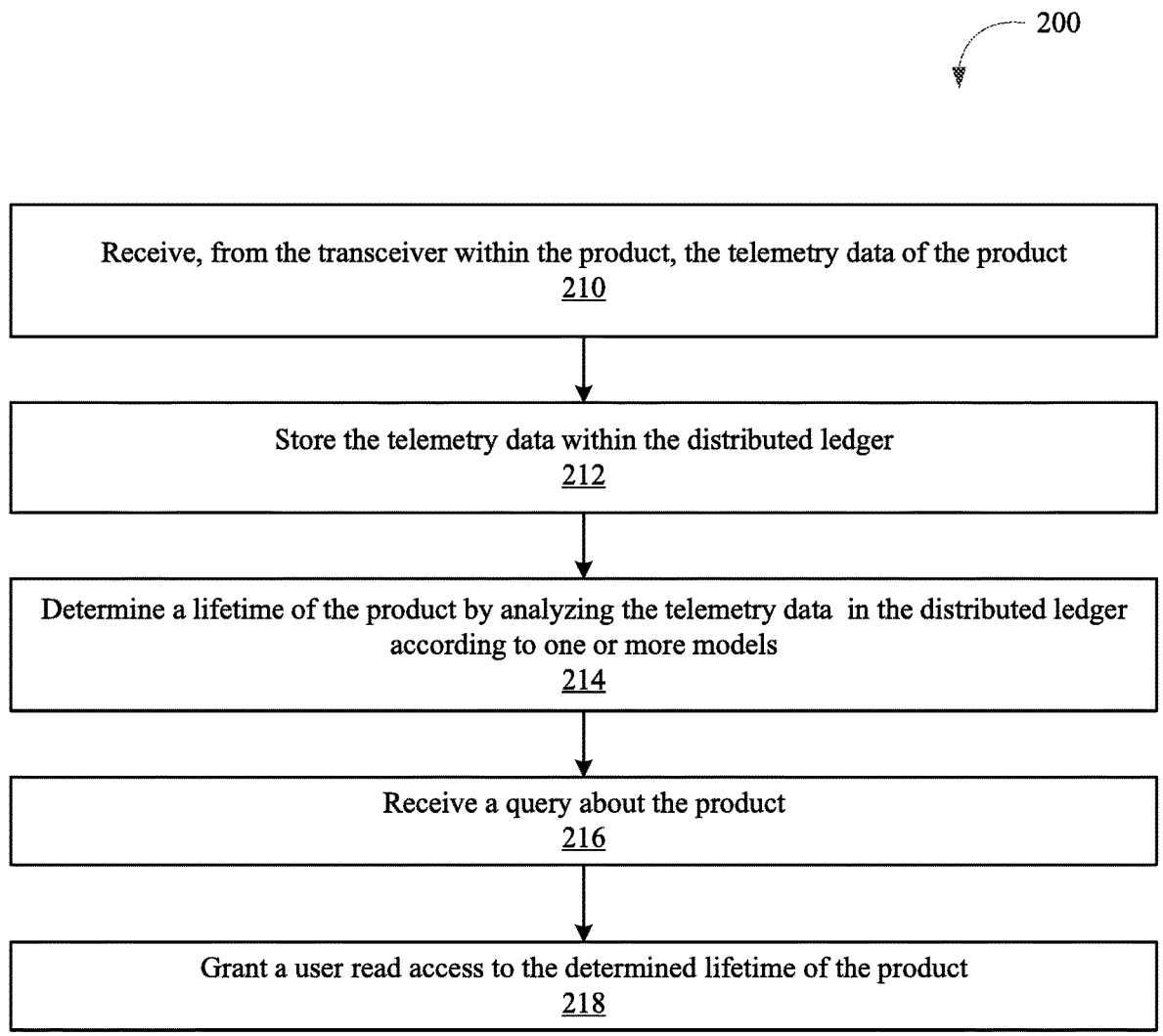
FIG. 2 is a flowchart representation of an example implementation of determining and presenting a resold product's lifetime environment in accordance with some embodiments.

FIG. 2 is a flowchart representation of an example implementation of determining and presenting a resold product's lifetime environment in accordance with some embodiments. The method begins when a node within blockchain network 160 receives (210), from the transceiver within the product, the telemetry data of the product. The telemetry data can be stored (212) within the blockchain ledger 150, which can include real time or near real time updates based on the product's power consumption, usage over a period of time (e.g., used only 60% of the year), the product's load, etc.

A remaining lifetime of the product can be determined (214) by analyzing the telemetry data in the distributed ledger according to one or more models. The lifetime can identify how much time is remaining for the product to operate according to a specified performance level in order to be a reliable indicator of product performance.

Therefore, when a node within blockchain network 160 receives (216) a query about the product, the telemetry data and/or determination of the remaining lifetime of the product can be accessed from the blockchain ledger 160. A user can then be granted (218) read access to the determined lifetime of the product. In some embodiments, the user can be granted read access to a portion or the entire history of the telemetry data of the product in response to receiving the query. In some embodiments, the access granted to the user can be subject to restrictions. Some of these restrictions can include granting the user read access to only a portion of the telemetry data or other decentralized information of the product to the user, but not access to the entire decentralized information or no ability to write to blockchain ledger 150. For example, a level of access can be granted to the user that restricts at least a portion of read access to distributed information within the distributed ledger based on one or more rules or policies within a smart contract specified by the distributed ledger network.

Figure 3:
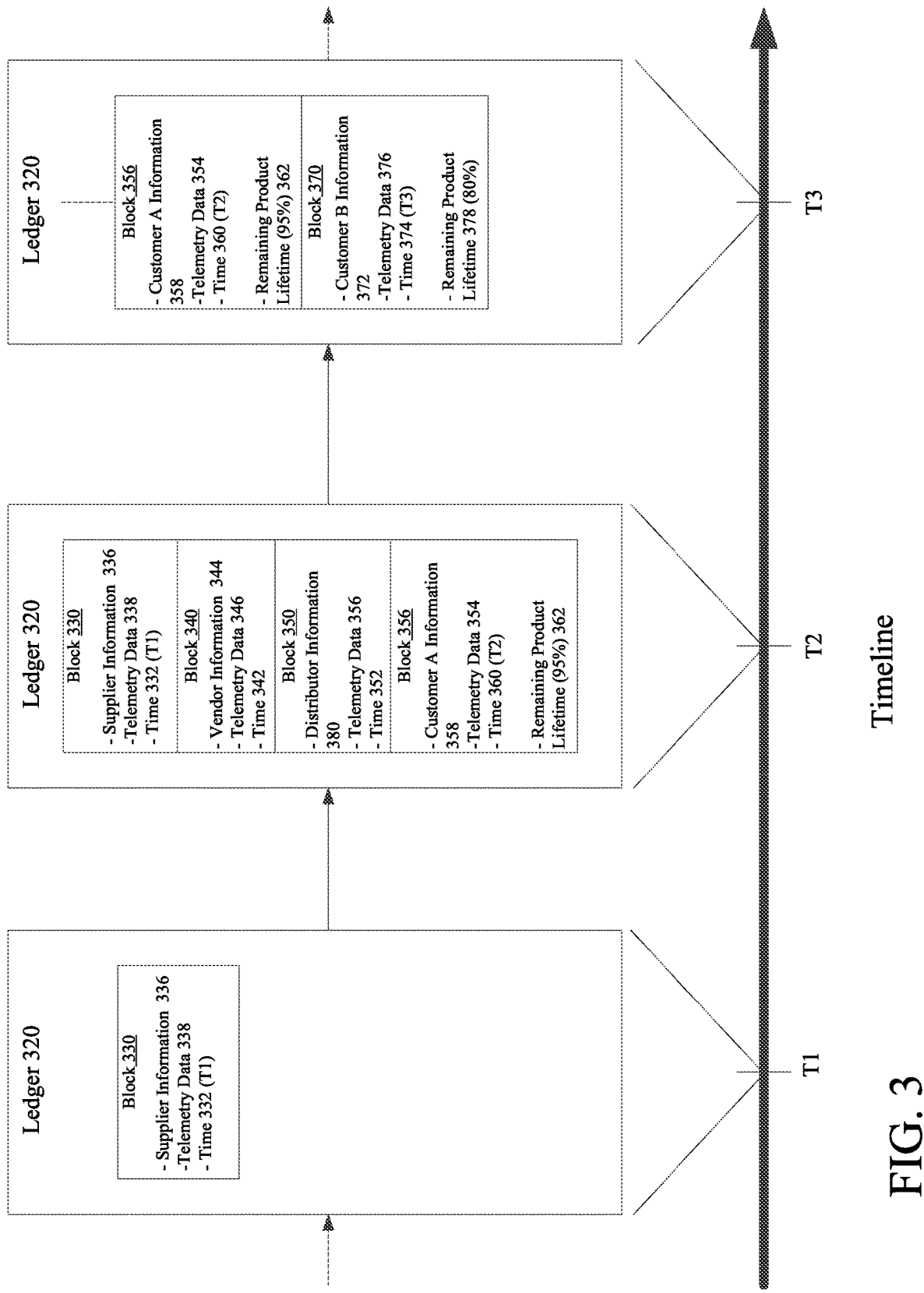
FIG. 3 shows a block diagram of an example implementation of a blockchain in accordance with some embodiments.

FIG. 3 shows a block diagram of an example implementation of a blockchain in accordance with some embodiments. Blockchain ledger 320 is shown at multiple times within the supply chain and resale process. Blockchain ledger 320 is illustrated at times T1, T2, and T3, which are separated by time intervals controlled by blockchain network 160. For example, blockchain ledger 320 includes a first block (block 330) at time T1, with block 356 appended to blockchain ledger 320 at T2, and block 370 appended to blockchain ledger 320 at T3.

Each block can be appended at any time there is a step or event in the product's supply chain, such as the product's sale and/or resale timeline. Each block can also contain multiple transactions from multiple suppliers and/or partners. For example, at time T1, blockchain ledger 320 can append block 330 that records supplier information 336 about the product, such as its origins, identification, and other product information. Moreover, block 330 can include telemetry data 338 of the product received at time 332 (e.g., at T1).

At subsequent time T2, blockchain ledger 320 has recorded subsequent events related to the distribution and sale of the product. For example, block 340 was appended at time 342 that recorded vendor information 344 and telemetry data 346 of the product. The telemetry data 346 can be sent by a transceiver within the product that continuously sends updates on its operation and performance levels. While the vendor may itself be verified, the telemetry data 346 can also provide verification that the product is still genuine and untampered, since the telemetry data 346 should be relatively consistent over time and it is much more difficult to fake the correct telemetry data 346 for that specific product at that moment in time. Similarly, block 350 can be appended by a distributor that includes distributor information 380 and telemetry data 356 at time 352.

Block 356 is appended when or after the product has been purchased by a customer (e.g., customer A). Block 356 can include customer A's information 358, as well as the telemetry data 354 at time 360 (e.g., at T2). Block 356 can also include the predicted remaining product lifetime 362 (e.g., 95% of life remains). While the example embodiment shows that the remaining lifetime is first displayed at or after sale, other embodiments can display the remaining product lifetime at any point before or after (such for blocks 330, 340, 350, etc.). In some embodiments the product can continue to transmit telemetry data, whether there has been a change in ownership or not, to the blockchain ledger 320 so that blocks are appended on a continuous, real time, or near real-time basis.

At T3, the product has been resold by customer A to customer B. At this point, block 370 can be appended to the blockchain ledger 320 that includes customer B's information 372, the product's telemetry data 376 at time 374 (e.g., T3), and the remaining product lifetime 378 (80%). In this way, if a potential customer wishes to purchase the product on a used basis, the potential customer can easily view and determine how well the product is working and how long, which can enable them to make an informed determination about whether the product will meet their needs. The remaining product lifetime can be based on predictive analytics based on telemetry data related to product history and historical performance, component traceability, and other analytics. In some embodiments, the predictive analytics can be included within one or more smart contracts with intelligence that is applied to the blockchain system.

Accordingly, the above enables blockchain technology to predict and display the lifetime of a product resold by certified vendors during resale. It utilizes an approach where data analytics based on a product's telemetry data can monitor and more accurately predict the remaining lifetime of the product, making the resale process trustworthy, decentralized, and visible to every end user on the blockchain.

Figure 4:
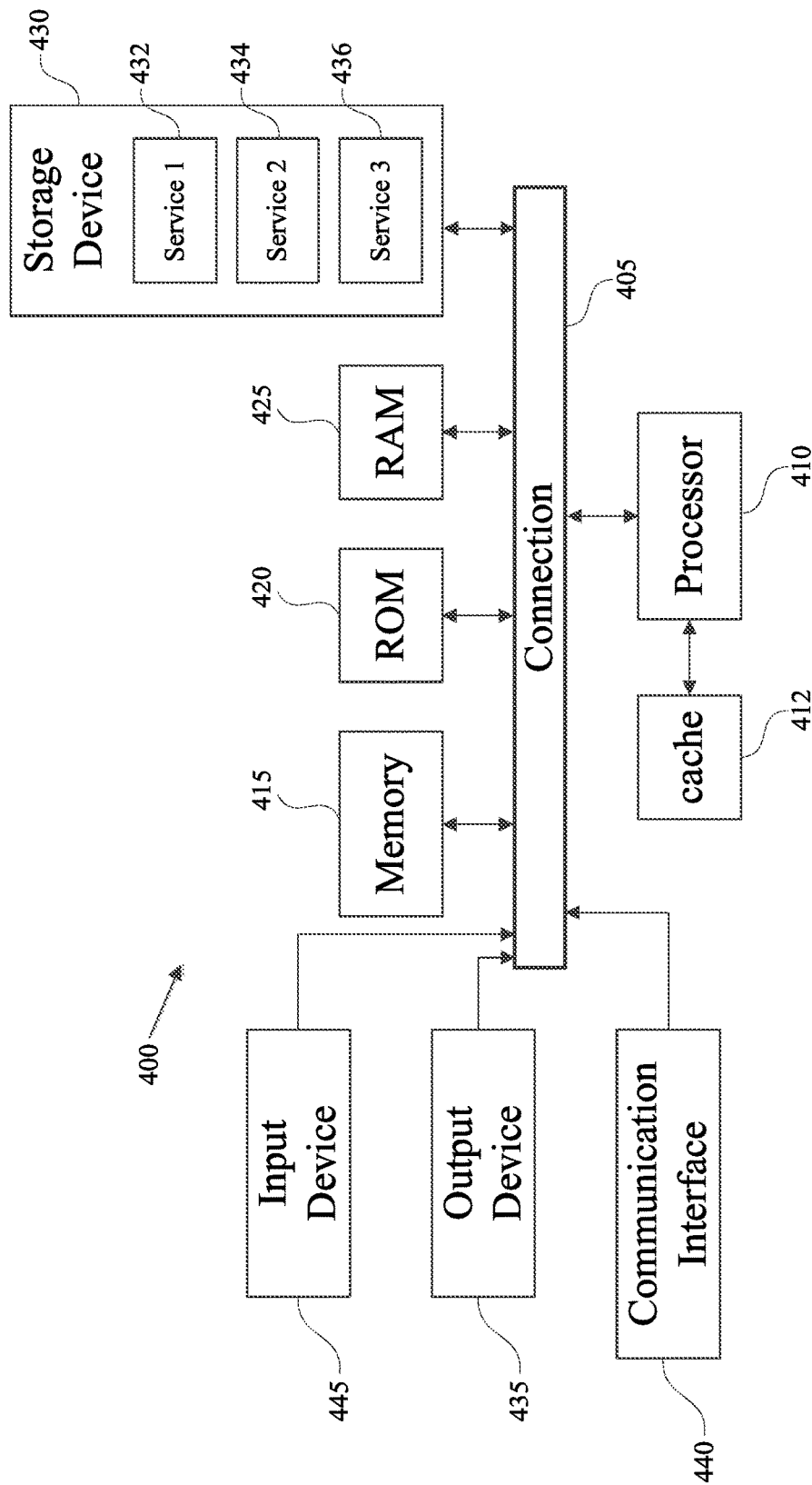
FIG. 4 shows an example of a system for implementing certain aspects of the present technology.

FIG. 4 shows an example of computing system 400 for use in components illustrated in FIGS. 1 and 3, in which the components of the system are in communication with each other using connection 405. Connection 405 can be a physical connection via a bus, or a direct connection into processor 410, such as in a chipset architecture. Connection 405 can also be a virtual connection, networked connection, or logical connection.

In some embodiments computing system 400 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 400 includes at least one processing unit (CPU or processor) 410 and connection 405 that couples various system components including system memory 415, such as read only memory (ROM) and random access memory (RAM) to processor 410. Computing system 400 can include a cache of high-speed memory connected directly with, in close proximity to, or integrated as part of processor 410.

Processor 410 can include any general purpose processor (or any form of processing intelligence) and a hardware service or software service, such as services 432, 434, and 436 stored in storage device 430, configured to control processor 410 as well as a special-purpose processor where software instructions are incorporated into the actual processor design. Processor 410 may essentially be a completely self-contained computing system, containing multiple cores or processors, a bus, memory controller, cache, etc. A multi-core processor may be symmetric or asymmetric.

To enable user interaction, computing system 400 includes an input device 445, which can represent any number of input mechanisms, such as a microphone for speech, a touch-sensitive screen for gesture or graphical input, keyboard, mouse, motion input, speech, etc. Computing system 400 can also include output device 435, which can be one or more of a number of output mechanisms known to those of skill in the art. In some instances, multimodal systems can enable a user to provide multiple types of input/output to communicate with computing system 400. Computing system 400 can include communications interface 440, which can generally govern and manage the user input and system output. There is no restriction on operating on any particular hardware arrangement and therefore the basic features here may easily be substituted for improved hardware or firmware arrangements as they are developed.

Storage device 430 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 430 can include software services, servers, services, etc., that when the code that defines such software is executed by the processor 410, it causes the system to perform a function. In some embodiments, a hardware service that performs a particular function can include the software component stored in a computer-readable medium in connection with the necessary hardware components, such as processor 410, connection 405, output device 435, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A system for predicting product lifetime comprising:
    a transceiver within a product configured to transmit telemetry data associated with the product; and
    a node within a distributed ledger network in communication with the transceiver and a distributed ledger associated with nodes within the distributed ledger network, the node configured to:
        receive, from the transceiver within the product, the telemetry data of the product;
        store the telemetry data within the distributed ledger;
        determine a lifetime of the product by analyzing the telemetry data in the distributed ledger according to one or more models; and
        after determining the lifetime of the product, grant a user read access to the determined lifetime of the product and authenticate the product in response to receiving a query about the product.

2. The system of claim 1, wherein the lifetime identifies how much time is remaining for the product to operate according to a specified performance level.

3. The system of claim 1, wherein the telemetry data specifies a performance level of an internal component of the product.

4. The system of claim 1, the node further configured to:
    receive decentralized information about the product from another node within the distributed ledger network, and wherein the decentralized information includes real time updates for the telemetry data.

5. The system of claim 1, the node further configured to:
    receive a query about the product; and
    grant a user read access to a history of the telemetry data of the product in response to receiving the query.

6. The system of claim 1, wherein turning on the product triggers the node to receive and append the telemetry data within the distributed ledger.

7. The system of claim 1, the node further configured to:
grant a level of access that restricts at least a portion of read access to distributed information within the distributed ledger based on one or more rules or policies within a smart contract specified by the distributed ledger network.

8. A method for predicting product lifetime comprising:
receiving, from a transceiver within a product, telemetry data of the product;
storing the telemetry data within a distributed ledger;
determining a lifetime of the product by analyzing the telemetry data in the distributed ledger according to one or more models; and
after determining the lifetime of the product, granting a user read access to the determined lifetime of the product and authenticating the product in response to receiving a query about the product.

9. The method of claim 8, wherein the lifetime identifies how much time is remaining for the product to operate according to a specified performance level.

10. The method of claim 8, wherein the telemetry data specifies a performance level of an internal component of the product.

11. The method of claim 8, the method further comprising:
receiving decentralized information about the product from another node within a distributed ledger network, and
wherein the decentralized information includes real time updates for the telemetry data.

12. The method of claim 8, the method further comprising:
receiving a query about the product; and
granting a user read access to a history of the telemetry data of the product in response to receiving the query.

13. The method of claim 8, wherein turning on the product triggers a node to receive and append the telemetry data within the distributed ledger.

14. The method of claim 8, the method further comprising:
granting a level of access that restricts at least a portion of read access to distributed information within the distributed ledger based on one or more rules or policies within a smart contract specified by a distributed ledger network.

15. A non-transitory computer-readable medium comprising instructions stored thereon, the instructions executable by one or more processors of a computing system to perform a method for predicting product lifetime, the instructions causing the computing system to:
receive, from a transceiver within a product, telemetry data of the product;
store the telemetry data within a distributed ledger;
determine a lifetime of the product by analyzing the telemetry data in the distributed ledger according to one or more models; and
after determining the lifetime of the product, grant a user read access to the determined lifetime of the product and authenticate the product in response to receiving a query about the product.

16. The non-transitory computer-readable medium of claim 15, wherein the lifetime identifies how much time is remaining for the product to operate according to a specified performance level.

17. The non-transitory computer-readable medium of claim 15, wherein the telemetry data specifies a performance level of an internal component of the product.

18. The non-transitory computer-readable medium of claim 15, further comprising instructions executable to:
receive decentralized information about the product from another node within a distributed ledger network, and
wherein the decentralized information includes real time updates for the telemetry data.

19. The non-transitory computer-readable medium of claim 15, further comprising instructions executable to:
receive a query about the product; and
grant a user read access to a history of the telemetry data of the product in response to receiving the query.

20. The non-transitory computer-readable medium of claim 15, wherein turning on the product triggers a node to receive and append the telemetry data within the distributed ledger.

* * * * *